(12) United States Patent
Garbagnati et al.

(10) Patent No.: US 7,033,295 B2
(45) Date of Patent: Apr. 25, 2006

(54) FLUID CHAIN-TIGHTENER

(75) Inventors: Carlo Garbagnati, Castello Brianza (IT); Gianfranco Coscia, Merate (IT)

(73) Assignee: Regina S.I.C.C. S.p.A., Milan (IT)

( * ) Notice: Subject to any disclaimer, the term of this patent is extended or adjusted under 35 U.S.C. 154(b) by 201 days.

(21) Appl. No.: 10/443,049

(22) Filed: May 22, 2003

(65) Prior Publication Data

US 2003/0228948 A1 Dec. 11, 2003

(30) Foreign Application Priority Data

Jun. 7, 2002 (IT) .......................... MI2002A1243

(51) Int. Cl.
*F16H 7/08* (2006.01)
*F16H 7/22* (2006.01)

(52) U.S. Cl. ..................... 474/110; 474/111; 474/109

(58) Field of Classification Search ........ 474/109–111, 474/101, 140; 123/90.15
See application file for complete search history.

(56) References Cited

U.S. PATENT DOCUMENTS

| | | | | |
|---|---|---|---|---|
| 2,210,276 A | * | 8/1940 | Bremer | ....................... 474/110 |
| 3,964,331 A | * | 6/1976 | Oldfield | ...................... 474/110 |
| 4,553,509 A | * | 11/1985 | Mezger et al. | ........... 123/90.27 |
| 5,197,420 A | * | 3/1993 | Arnold et al. | .............. 474/110 |
| 5,323,739 A | * | 6/1994 | Mollers | ................... 123/90.15 |
| 5,597,367 A | * | 1/1997 | Trzmiel et al. | ............. 474/110 |
| 5,606,941 A | * | 3/1997 | Trzmiel et al. | ............. 474/111 |
| 5,700,216 A | * | 12/1997 | Simpson et al. | ............ 474/110 |
| 5,776,024 A | * | 7/1998 | White et al. | ................ 474/110 |
| 5,951,423 A | * | 9/1999 | Simpson | ..................... 474/109 |
| 6,129,644 A | * | 10/2000 | Inoue | ......................... 474/101 |
| 6,205,965 B1 | * | 3/2001 | Stephan et al. | .......... 123/90.15 |
| 6,322,470 B1 | * | 11/2001 | Markley et al. | ............ 474/111 |
| 2002/0160868 A1 | * | 10/2002 | Wigsten et al. | ............. 474/101 |

* cited by examiner

*Primary Examiner*—Marcus Charles
(74) *Attorney, Agent, or Firm*—Jacobson Holman PLLC

(57) ABSTRACT

Chain tightener comprising a first supporting surface (11) on one branch (12) of the chain and a second supporting surface (13) on the other branch (14) of the chain with each supporting surface (11,13) being connected to a respective drive piston (19,119,20,120) into which is fed fluid for thrust in a tightening direction of the respective chain branch with the hydraulic circuits of the two pistons interconnected so that when one piston (19,119 or 20,120) is thrust in the direction opposite tightening from the tight branch of the chain it sends its fluid into the other piston (20,120 or 19,119) to thrust it to tighten the corresponding slack chain branch.

16 Claims, 1 Drawing Sheet

FLUID CHAIN-TIGHTENER

BACKGROUND OF THE INVENTION

1. Field of the Invention

The present invention relates to an innovative chain tightener.

2. State of the Prior Art

In chain transmissions between two sprocket wheels there is always one branch under tension and a slack branch. It is often important to hold the oscillations of the slack branch under control to avoid excessive flapping and noise of the chain and resulting premature wear paired with reduced efficiency. To achieve this, slack branch tightening systems consisting either of fixed runners whose position is adjusted manually according to need or by automatic tighteners consisting of a runner thrust against the slack chain branch are normally used.

Under particular operating conditions the tension of the two chain branches can be reversed so that the branch which was slack first becomes the tight branch and vice versa.

A special case of chain transmission subject to such pull reversal is the primary transmission between motor and gearbox used on some motor vehicles and automobiles.

When there is a reversal of load on the transmission, for example during an abrupt deceleration, the tight branch becomes slack while the slack branch becomes tight. In such a situation, if the tightener runner backs under the thrust of the chain, an uncontrolled slack branch is formed where previously there was a tight branch. Vice versa, if the tightener runner does not back, both chain branches remain reasonably under control but the runner and the tightener have to withstand a strong thrust which could lead to accelerated wear of the runner and sagging because of fatigue of the antireturn mechanism which is usually provided for recovery of play caused by progressive lengthening of the chain.

Use of two retractable tighteners, one per branch, driven by a simple spring, does not solve the problem because even if the runners tend to follow the two branches of the chain the springs tend to trigger harmful oscillations.

The general purpose of the present invention is to remedy the above mentioned shortcomings by making available a tightener acting in a satisfactory manner on the slack branch of the chain whichever it might be while compensating for the play and avoiding harmful stress.

SUMMARY OF THE INVENTION

In view of this purpose it was sought to provide in accordance with the present invention a chain tightener comprising a first supporting surface on one branch of the chain and a second supporting surface on the other branch of the chain with each supporting surface being connected to a respective drive piston into which is fed fluid for thrust in a tightening direction of the respective chain branch with the hydraulic circuits of the two pistons interconnected so that when one piston is thrust in the direction opposite tightening from the tight branch of the chain it sends its fluid into the other piston to thrust it to tighten the corresponding slack chain branch.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying the principles. In the drawings.

DETAILED DESCRIPTION OF THE INVENTION

Figure 1:
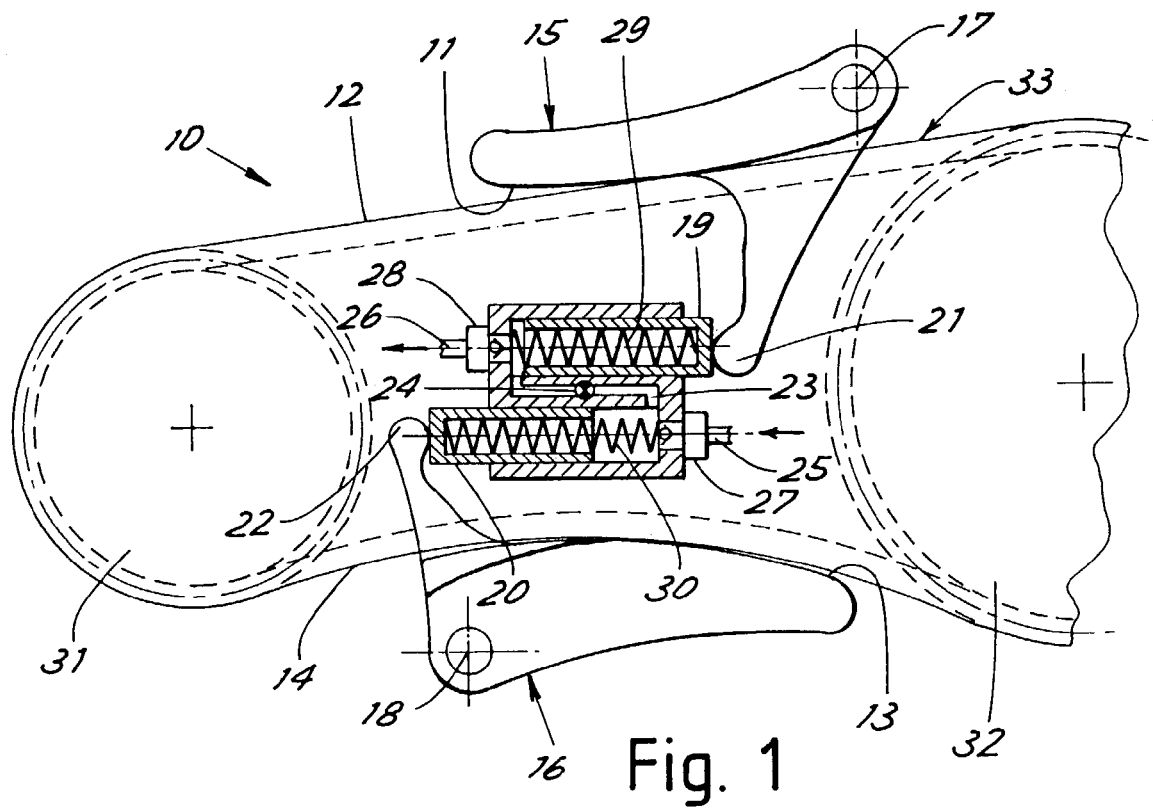
FIG. 1 shows a diagrammatic view of a first embodiment of a tightener in accordance with the present invention.

With reference to the figures, FIG. 1 shows as a whole designated by reference number 10 a tightener for a chain 33 realized in accordance with the present invention and comprising a first supporting surface 11 on one branch 12 of the chain and a second supporting surface 13 on the other branch 14 of the chain.

Each thrust surface 11,13 is advantageously realized on an arm of a respective bell crank 15,16. The levers are pivoted at 17,18 and are thrust to rotate around the pivot to tighten the respective chain branch by means of a corresponding thrust piston 19,20 supporting and acting on the other arm 21,22 of the lever. It is clear from the figure that when a piston is fed with fluid under pressure it pushes on its own lever to tighten the associated branch of the chain.

Advantageously each piston comprises an internal spring 29,30 having relatively light outward thrust. In the embodiment shown the pistons are arranged generally parallel with each other and directed in opposite directions so that each is turned towards a sprocket of a pair of wheels 31,32 winding the chain.

The hydraulic circuits of the two pistons 19,20 are interconnected by a duct 23 so that when a piston is thrust in the direction opposite to tightening of the chain branch being tightened the piston sends its fluid into the other piston to thrust it to tighten the corresponding chain branch which is becoming slack at the same time.

In other words, the tightening thrust of the slack branch is generated by the tight branch. The fluid can appropriately be oil of fluid grease.

Advantageously the hydraulic circuits of the two pistons 19,20 are interconnected through at least one choke 24 appropriately sized to regulate fluid passage speed from one piston to the other so as to avoid too rapid movement of the pistons with possible oscillations and violent shocks at the end of travel. The choke should be sized in accordance with specific requirements of speed of response and damping of the transients.

By appropriately sizing the pistons and the idler arms as readily imaginable to those skilled in the art, when one branch is completely tight (branch 12 in FIG. 1) the opposite, slack, branch is held perfectly in tension by the tightener with an appropriate and predetermined thrust. Upon reversal of the tight and slack branches the guide tightener gradually guides the branches to avoid oscillations.

To recover the play caused for example by gradual lengthening of the chain over time the hydraulic circuits of the pistons are advantageously connected in a controlled manner to a fluid source 25 and a fluid drain 26 adjusted to hold the fluid in the circuits virtually within predetermined maximum and minimum pressures corresponding to a predetermined tightening of the slack branch of the chain. When the chain lengthens, the tight branch pushes the corresponding piston to the stop before the other piston has pushed the slack branch sufficiently tight. Consequently the thrust of the slack branch through the corresponding tightener lever on the corresponding piston will be less than that set. The fluid source will therefore input new fluid into the circuit by having the slack branch piston complete the additional travel up to the predetermined tightening.

Contrariwise, if for any reason there is an excess of fluid producing excessive tightening of the slack branch the resulting overpressure in the fluid circuit causes automatic draining of the excess fluid through 26. In the embodiment of FIG. 1 the fluid source can be the delivery of a circulation pump—not shown because of known type readily imaginable to those skilled in the art, for example also employed for moving oil in other parts of the machine of which the chain transmission is a part—which sets the pressure in the circuit. Fluid input from the pump to the piston circuit can take place through a known one-way valve 27 while drain can be through a suitably calibrated known overpressure valve 28. This ensures holding pressure between a maximum and a minimum value ensuring a corresponding holding of the tension of the slack branch of the chain between maximum and minimum values predetermined to be optimal.

Figure 2:
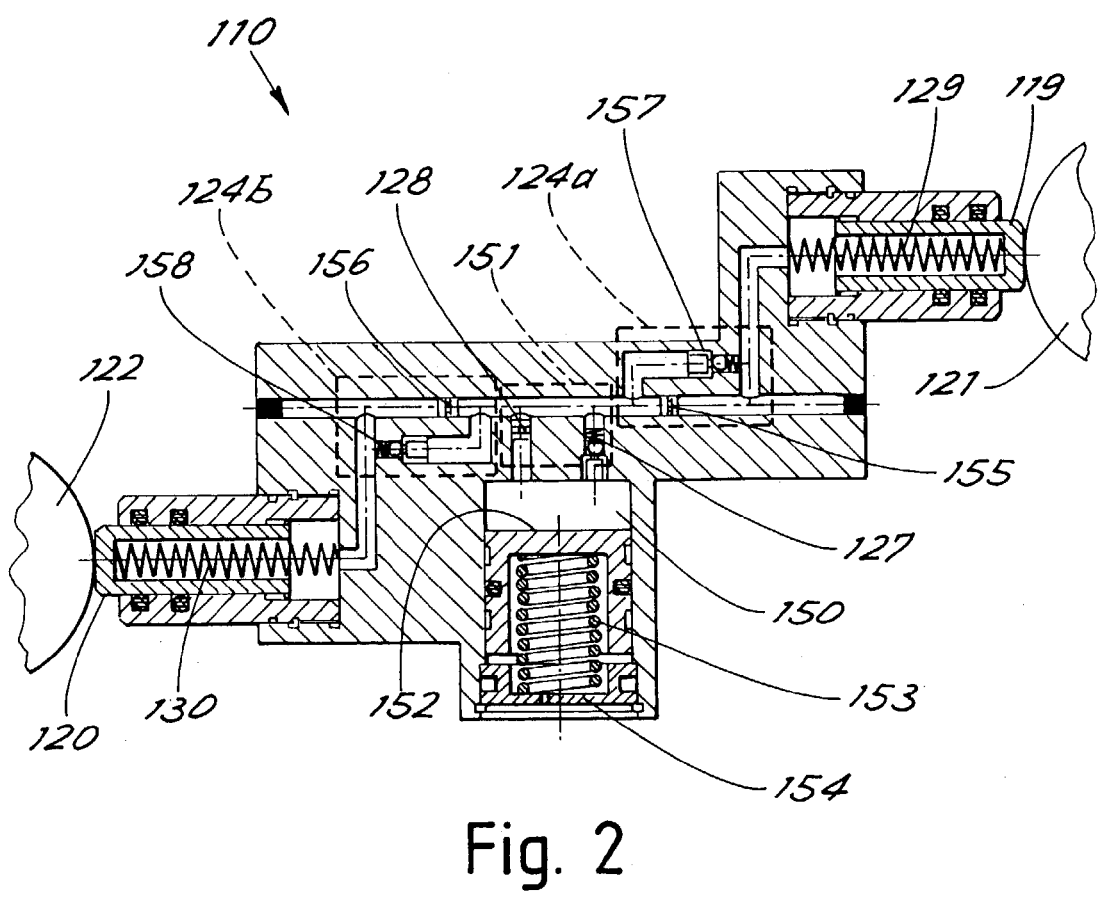
FIG. 2 shows a variant embodiment of the tightener of FIG. 1.

FIG. 2 shows a variant embodiment of the tightener in accordance with the present invention. For the sake of clarity and convenience members of the embodiment of FIG. 2 are designated by the same number increased by 100 employed for the corresponding members in FIG. 1. Thus there is a tightener 110 with pistons 119,120 acting on arms 121,122 of thrust levers on the chain branches. The levers and chain are not shown since they are analogous to those shown in FIG. 1. The pistons also have springs 129,130.

In the embodiment of FIG. 2 the fluid source and the drain are both realized with the same tank 150 with a fluid reserve under pressure and connected to the hydraulic circuits of the thrust pistons through controlled passage means 151 allowing passage of the fluid from and to the tank depending on the above mentioned maximum and minimum pressure conditions in the hydraulic circuit.

Since the entire hydraulic circuit is sealed, appropriate outward seals are provided.

Advantageously the controlled passage means 151 comprise a one-way valve 127 for sending fluid from the tank to the hydraulic circuits when the pressure of the fluid in the tank is more than that of the hydraulic circuits and a choked passage or an overpressure valve 128 for return of the fluid from the hydraulic circuits to the tank when the pressure in the tank is less than in the hydraulic circuits.

Again advantageously, the reserve fluid is held under pressure by a piston 152 arranged on the tank bottom with elastic thrust on the reserve fluid by means of a calibrated spring 153 hold in position by a cap 154.

Between the thrust pistons 119 and 120 there are means 124a and 124b for controlled fluid passage arranged in the path between the tank and each thrust piston. In this manner, in addition to regulating the speed of transfer of the fluid between the pistons, they control the exchange of fluid between the tank and the pistons. In particular, the controlled passage means comprise both a choke 155,156 and, in parallel with the choke, a one-way valve 157,158 directed from the tank to the thrust piston. The chokes 155,156 are bigger than the choke 128. In the passage of the fluid between the pistons the fluid is thus facilitated in passing from one piston to the other rather than from the piston circuit to the tank.

Passage towards the tank takes place only when there is actual increase in pressure beyond the value set by the calibrated spring 153 located in the tank with speed determined by the choke 128. This avoids undesired oscillations.

Contrariwise, in the opposite direction fluid passage is facilitated by the one-way valves which open.

It is now clear that the predetermined purposes have been achieved by making available a tightener ensuring correct tightening of the chain whichever be the tight branch while avoiding harmful oscillations, excessive stress and abnormal wear and at the same time automatically compensating for any reasonable lengthening of the chain. The system discussed was found particularly advantageous for motorcycle primary chain drives.

Naturally, the above description of an embodiment applying the innovative principles of the present invention is given by way of non-limiting example of the principles within the scope of the exclusive right claimed here. For example, the controlled fluid passage means could be different from those shown. In particular, the one-way valves in parallel with the chokes could even be lacking if considered unnecessary or the paired chokes and one-way valves could be replaced by appropriate known valves with immediate opening in one direction and calibrated pressure opening in the other. The entire tightener and chain assembly could be in an oil bath. In addition, if considered necessary, for example with pump pressurized fluid feed, the hydraulic circuit of the pistons could comprise known means of exhausting gas to avoid accumulation of gas in the circuit. Lastly, the spring 153 could be made calibratable from the outside, for example by screwing down the cap 154 more or less.

What is claimed is:

1. A chain tightener for chains having a first branch and a second branch, wherein alternate reversal of chain tension occurs between the first branch and the second branch so that one of the first branch and the second branch is tight while the other of the first branch and the second branch is slack, said chain tightener comprising a first supporting surface on the first branch of the chain and a second supporting surface on the second branch of the chain, with both supporting surfaces alternately acting as a tightening element on the chain branch currently being slack and each supporting surface being connected to a respective drive piston having an associated hydraulic circuit into which a fluid is fed for thrust in a tightening direction of the respective chain branch, with the hydraulic circuits of the two pistons being interconnected so that when any one of the pistons is thrust in a direction opposite to the tightening direction by the chain branch that is currently tight, said one piston sends the fluid of the associated hydraulic circuit into the other piston to thrust said other piston to tighten the other chain branch currently being slack.

2. The tightener in accordance with claim 1 characterized in that the hydraulic circuits of the two pistons are interconnected through at least one choke sized to adjust the speed of passage of the fluid from one piston to the other.

3. The tightener in accordance with claim 1 characterized in that the hydraulic circuits of the pistons are connected in a controlled manner to a source of fluid and to a fluid drain adjusted to hold the fluid in the circuits virtually within predetermined maximum and minimum pressures corresponding to a predetermined tightening of the slack branch of the chain.

4. The tightener in accordance with claim 3 characterized in that the fluid input from the source to the circuit of the pistons takes place through a one-way valve while drain takes place through an overpressure valve.

5. The tightener in accordance with claim 3 characterized in that the fluid source is the delivery of a fluid pump.

6. The tightener in accordance with claim 3 characterized in that the source and drain are realized with a tank having a fluid reserve under pressure and connected to said hydraulic circuits through controlled passage means.

7. The tightener in accordance with claim 6 characterized in that the reserve fluid is held under pressure by a piston arranged in the tank and having elastic thrust on the reserve fluid.

8. The tightener in accordance with claim 7 characterized in that the elastic thrust is obtained by means of a calibrated spring.

9. The tightener in accordance with claim 6 characterized in that the controlled passage means comprise a one-way valve for sending the fluid from the tank to the hydraulic circuits when the fluid pressure in the tank is higher than that in the hydraulic circuits and a choked passage for return of the fluid from the hydraulic circuits to the tank when the tank pressure is less than that in the hydraulic circuits.

10. The tightener in accordance with claim 1 characterized in that the hydraulic circuit between each operating piston and the tank comprises controlled passage means.

11. The tightener in accordance with claim 10 characterized in that the controlled passage means comprise a choke.

12. The tightener in accordance with claim 11 characterized in that the controlled passage means comprise in parallel with the choke a one-way valve directed from the tank to the thrust piston.

13. The tightener in accordance with claim 1 characterized in that each supporting surface is made on a first arm of a lever moved by its respective thrust piston.

14. The tightener in accordance with claim 13 characterized in that the levers are bell cranks having the first arm with an end arranged on the outside of the respective chain branch and another arm directed between the chain branches to rest on the respective thrust pistons.

15. The tightener in accordance with claim 14 characterized in that the thrust pistons are arranged generally directed in opposite directions so that each is turned towards a wheel of a pair of chain winding wheels.

16. The tightener in accordance with claim 1 characterized in that each thrust piston is thrust outward by its own spring.

\* \* \* \* \*